(12) United States Patent
Nash et al.

(10) Patent No.: US 11,955,028 B1
(45) Date of Patent: Apr. 9, 2024

(54) PRESENTING TRANSFORMED ENVIRONMENTAL INFORMATION

(71) Applicant: UIPCO, LLC, San Antonio, TX (US)

(72) Inventors: Justin Royell Nash, Little Elm, TX (US); Ivan Ortiz, Little Elm, TX (US); Austin Ray Keeton, Orange Park, FL (US); Subhalakshmi Selvam, Allen, TX (US); Fang Yuan Gonzalez, Frisco, TX (US); Huihui Wu, Grapevine, TX (US); Salvador Adrian Bretado, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 47 days.

(21) Appl. No.: 17/681,982

(22) Filed: Feb. 28, 2022

(51) Int. Cl.
G09B 21/00 (2006.01)
G06F 3/01 (2006.01)
H04S 7/00 (2006.01)

(52) U.S. Cl.
CPC ........... *G09B 21/003* (2013.01); *G06F 3/014* (2013.01); *G06F 3/016* (2013.01); *G09B 21/006* (2013.01); *G09B 21/009* (2013.01); *H04S 7/303* (2013.01); *H04S 2400/11* (2013.01)

(58) Field of Classification Search
CPC .. G09B 21/003; G09B 21/006; G09B 21/009; G06F 3/014; G06F 3/016; H04S 7/303; H04S 2400/11
See application file for complete search history.

(56) References Cited

U.S. PATENT DOCUMENTS

| | | |
|---|---|---|
| 2002/0156799 A1 | 10/2002 | Markel et al. |
| 2003/0046401 A1 | 3/2003 | Abbott et al. |
| 2006/0256950 A1 | 11/2006 | Patel et al. |
| 2013/0073949 A1 | 3/2013 | Barrell et al. |
| 2013/0246904 A1 | 9/2013 | Seliger et al. |
| 2014/0356824 A1 | 12/2014 | Dozier |

(Continued)

OTHER PUBLICATIONS

Akhter et al., "Conceptual Framework: How to Engineer Online Trust for Disabled Users", Sep. 2009, IEEE, 2009 IEEE/WIC/ACM International Conference on Web Intelligence and Intelligent Agent Technology—Workshops, p. 614-617 (Year: 2009).

*Primary Examiner* — Michelle Chin
(74) *Attorney, Agent, or Firm* — Potomac Law Group, PLLC; Dannon G. Allbee

(57) ABSTRACT

An environment-transforming system transforms a user's environmental information in ways that allow the user to better perceive her environment. For example, the system transforms some aspects of a visual scene into a sound space for a visually impaired user. Once the user learns to interpret the sound space, she avoids walking into an object because a sound cue tells her that the object is in her near environment and roughly where it is. Various types of transformations are possible depending upon the user's needs and preferences. As all people are different, each user has a personalized profile that directs the transformation process. More generally, the environment to be transformed may include aspects of artificial or enhanced reality. The transformed environmental information can be presented to the user in a number of ways, such as in haptic feedback, as directional audio, through oral stimulation, or through modified visual display.

20 Claims, 11 Drawing Sheets

(56) References Cited

U.S. PATENT DOCUMENTS

| | | |
|---|---|---|
| 2015/0262016 A1 | 9/2015 | Rothblatt et al. |
| 2016/0253910 A1 | 9/2016 | Fisher |
| 2017/0164029 A1 | 6/2017 | Dey et al. |
| 2017/0371411 A1 | 12/2017 | Vinmani et al. |
| 2018/0303702 A1* | 10/2018 | Novich .................. G06V 20/20 |
| 2018/0356887 A1 | 12/2018 | Ramaprakash et al. |
| 2019/0130436 A1 | 5/2019 | Ma et al. |
| 2020/0137347 A1 | 8/2020 | Rechner et al. |
| 2021/0098110 A1 | 4/2021 | Periyasamy et al. |
| 2021/0280296 A1 | 9/2021 | Houy |
| 2021/0304867 A1 | 9/2021 | Brewer et al. |
| 2022/0084438 A1 | 3/2022 | Bansal et al. |
| 2022/0116736 A1 | 4/2022 | Williams et al. |
| 2022/0254120 A1* | 8/2022 | Berliner .................. G06F 3/033 |
| 2023/0083418 A1 | 3/2023 | Mcduff et al. |
| 2023/0096357 A1 | 3/2023 | Dorn et al. |

* cited by examiner

PRESENTING TRANSFORMED ENVIRONMENTAL INFORMATION

TECHNICAL FIELD

The present disclosure is directed to assisting users in perceiving their environment, whether real, virtual, or a combination.

BACKGROUND

We make sense of our environment through our various sensory modalities. That is, we see things around us, hear sounds from them or from unseen sources, feel vibrations or touch surfaces, and taste and smell our food. However, this description does not always apply to those with impaired or otherwise out of the ordinary sensor apparatuses. These people often use other ways of sensing their environment, the red and white cane that allows the seeing-impaired to feel what others can see being an iconic example.

Today's world threatens to widen already existing gaps in environmental sensing because artificial reality ("XR") technologies (of all sorts including enhanced reality: see below) are beginning to present much useful information to its users but often in a way that the sensory-impaired cannot access. Especially of note are the purely "virtual objects" that XR introduces into a user's visual field.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
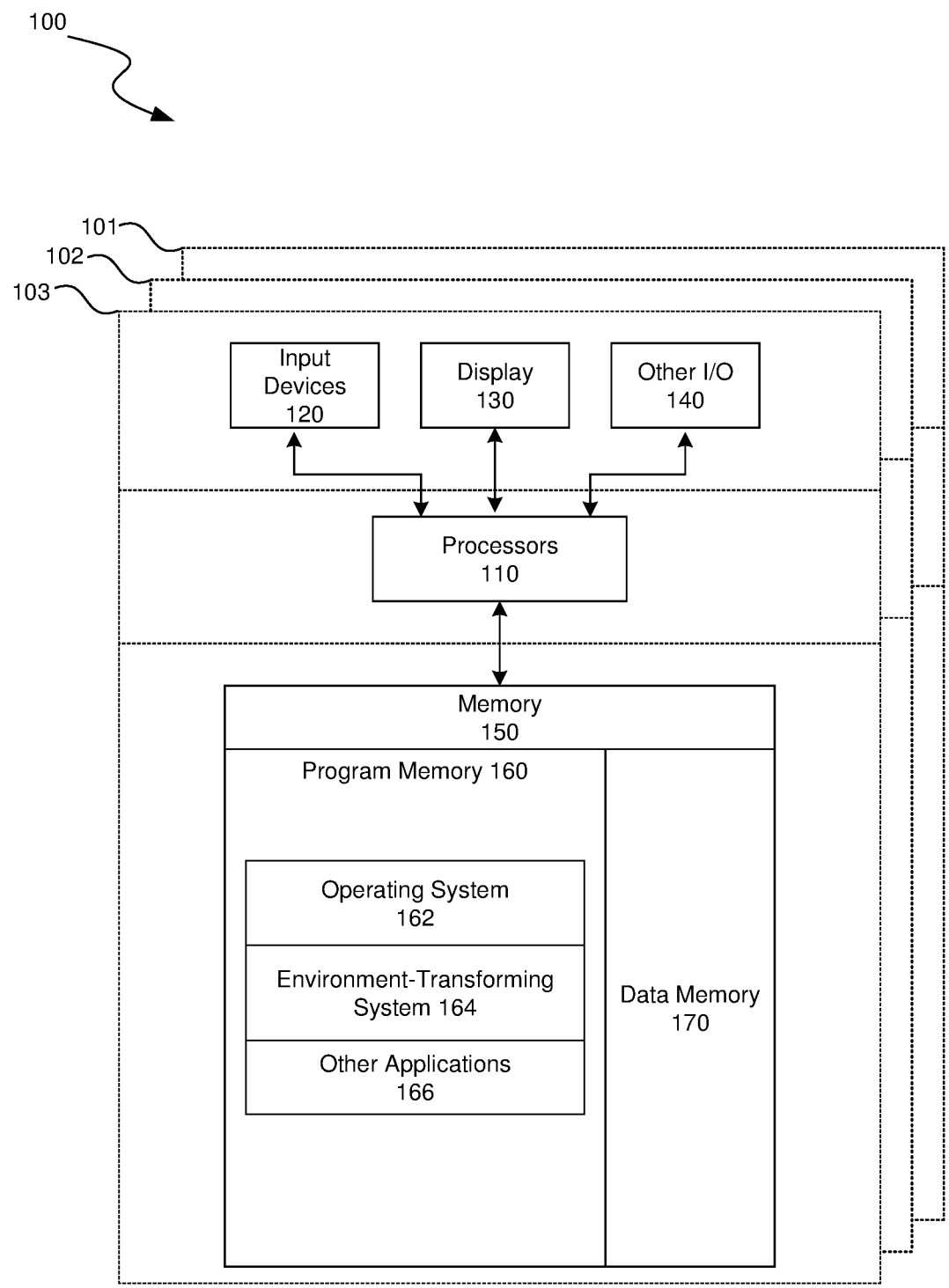
FIG. 1 is a block diagram illustrating an overview of devices on which some implementations of the present technology can operate.

Aspects of the present disclosure are directed to an environment-transforming system that can transform information in ways that allow users to better perceive their environment. The system receives information about the user's environment. The system then reviews that received information in light of the user's preferred sensory-modality. The system then transforms at least some of the received information in a way that makes it more readily perceivable by this user. The system presents the transformed information, sometimes in combination with received information that is left unaltered, to the user. Thus, the system provides the user with a personalized version of his environment, one he can perceive more readily than the untransformed one.

The user's environment may include real-world objects interspersed with aspects of artificial or enhanced reality ("XR"). (For a full description of this, see below.) Sources of the information received by the environment-transforming system can include data from real-world sensors (e.g., a camera and microphone) and an XR feed. In various implementations, the environment-transforming system can map the location and properties of the user and of various objects into a virtual space.

Each user can have a personalized profile that informs the transformation process. If the user is impaired in one of his sensory modalities, the profile can note this. In some cases, the transformation process is itself used to test the user's perceptual abilities and to help craft the user's profile.

With reference to the user's profile, the system can transform received environmental information to alleviate problems arising from the user's impaired sensory modalities. The system can, for example, transform aspects of a visual scene into an auditory sound space for a hearing-impaired user. Thus, various types of transformations are possible depending upon the user's needs and preferences.

The system can present the transformed environmental information to the user in a number of ways, depending upon circumstances and on the user's profile. The system notes whether or not the user is wearing a haptic glove, for example, and, if so, may direct touch information, transformed from received object-location information, to that glove. The system can also present an enriched sound space or altered visual view.

Thus, the environment-transforming system, in various implementations, can be configured to provide different environment transformations and/or the environment transforming system can select a transformation to apply based on the user's profile or the available hardware. The system maps a virtual reality space with the relative locations of the user and real and virtual objects in that space. When the map shows that an object is becoming important to the user (e.g., based on the object's size or proximity to the user), that information triggers the environment-transforming system to provide output for that object. Using the user's profile, the system provides output for the object in a manner that the user can readily perceive. For example, speakers can play frequency-range-altered sounds; a screen (possibly in an XR headset) can display a better lighted view of a room for those with limited low-light vision; recent advances allow transformed visual information to be delivered to a person's tongue, allowing a low resolution, but nonetheless real, visual experience to the blind; electronic implants can deliver sound sensations without the normal air vibrations; haptic gloves can inform a user of the presence or even the texture of virtual objects; etc.

In one case, the environment-transforming system can transform some aspects of a visual scene into a sound space for a visually impaired user. Once the user learns to interpret the sound space, she avoids walking into an object because a sound cue tells her that the object is in her near environment and roughly where it is. As she approaches the object, the sound associated with the object may change in tone or intensity to alert her to its proximity or allow her to interact with the object. In another example, for older people who tend to hear in only a limited frequency range when compared with younger people, the system compresses environmental sounds into the frequency range easily comprehended by the user. Alternatively, the system can strip out of the environment sounds outside the user's hearing range so as not to "muddy" the user's perception of sounds within the hearing range.

The present technology can be fully integrated into XR systems. For example, the transformation can include providing various haptic feedback responses when a user is "touching" a virtual object or with various haptic feedback types corresponding to object properties. This, for example, would allow a blind person to interact with a virtual object by being able to feel the object's presence though the haptic feedback. As another example, this would allow a color-blind user to gesture to pull a virtual object toward him, feel its texture through the haptic gloves, and note the object's color (possibly by added shading effects, a floating visual tag: "blue," or by feeling a haptic pattern that the user has learned to associate with the color blue). Thus, the present technology addresses both sensory-impairment and new issues associated with XR. As described below, aspects of the present technology build on existing computer systems to enhance the utility of these systems for all users regardless of the functional level of their sensory modalities.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Previous XR systems are directed to those users whose sensory perceptions fall into the normal range. For many other users, however, these previous systems are needlessly burdensome or simply unusable. The reason is that these previous systems assume that their users perceive and navigate the virtual world based on the XR-presented combination of sights and sounds, a task which many visually- and hearing-impaired users cannot fully perform. Because it transforms XR data into sensory modalities that match each user's capabilities, the environment-transforming system personalizes XR systems for those users whose sensory perceptions fall outside of the normal range, thus expanding the capabilities and scope of use of XR systems.

Several implementations are discussed below in more detail in reference to the figures. FIG. 1 is a block diagram illustrating an overview of devices on which some implementations of the disclosed technology can operate. The devices can comprise hardware components of a computing system 100 that presents transformed environmental information. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, an environment-transforming system 164, and other application programs 166. Memory 150 can also include data memory 170 that can include, e.g., user sensory-modality profiles, virtual models mapping real and virtual locations of object and users, environmental data, transformed environmental data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
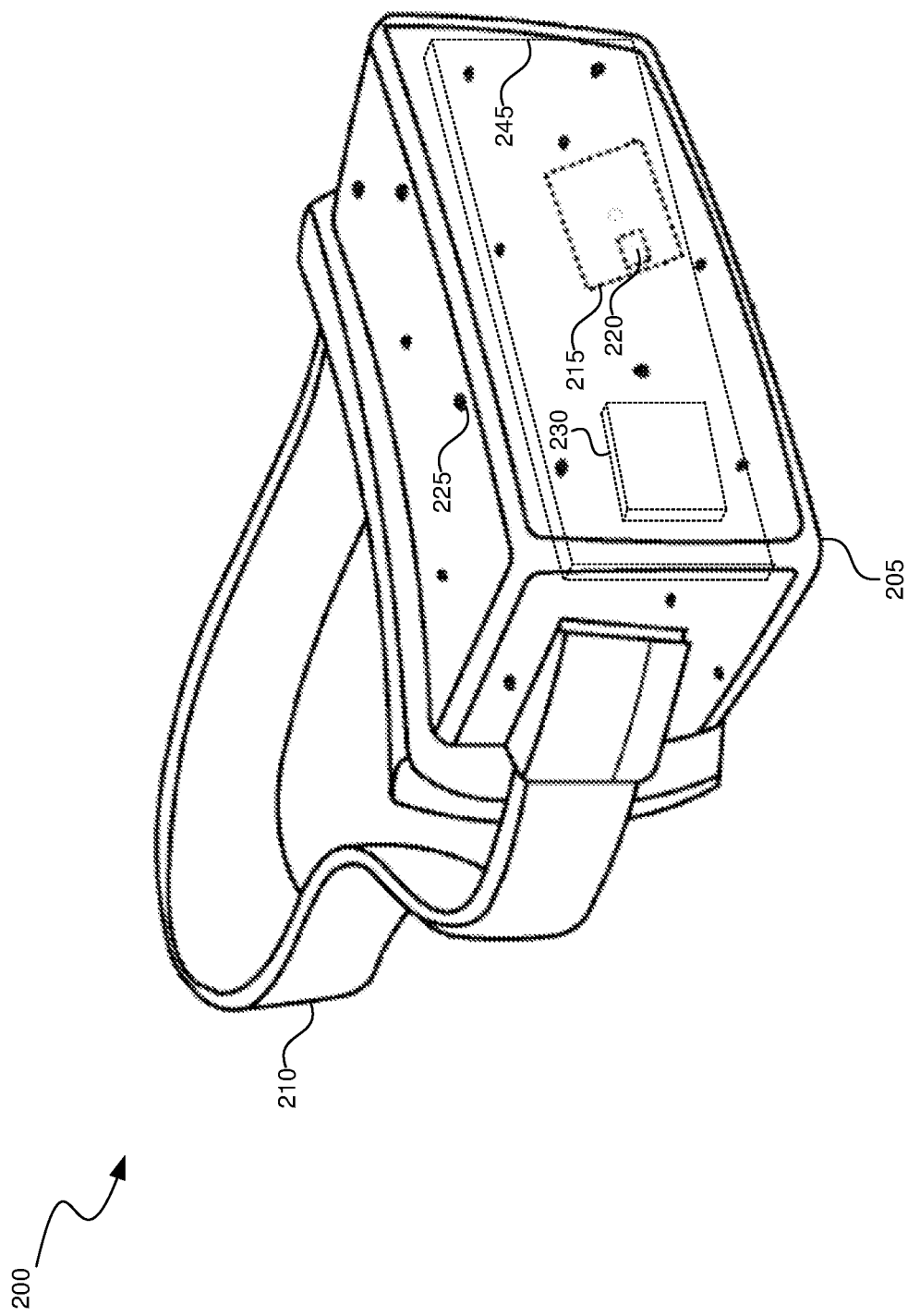
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
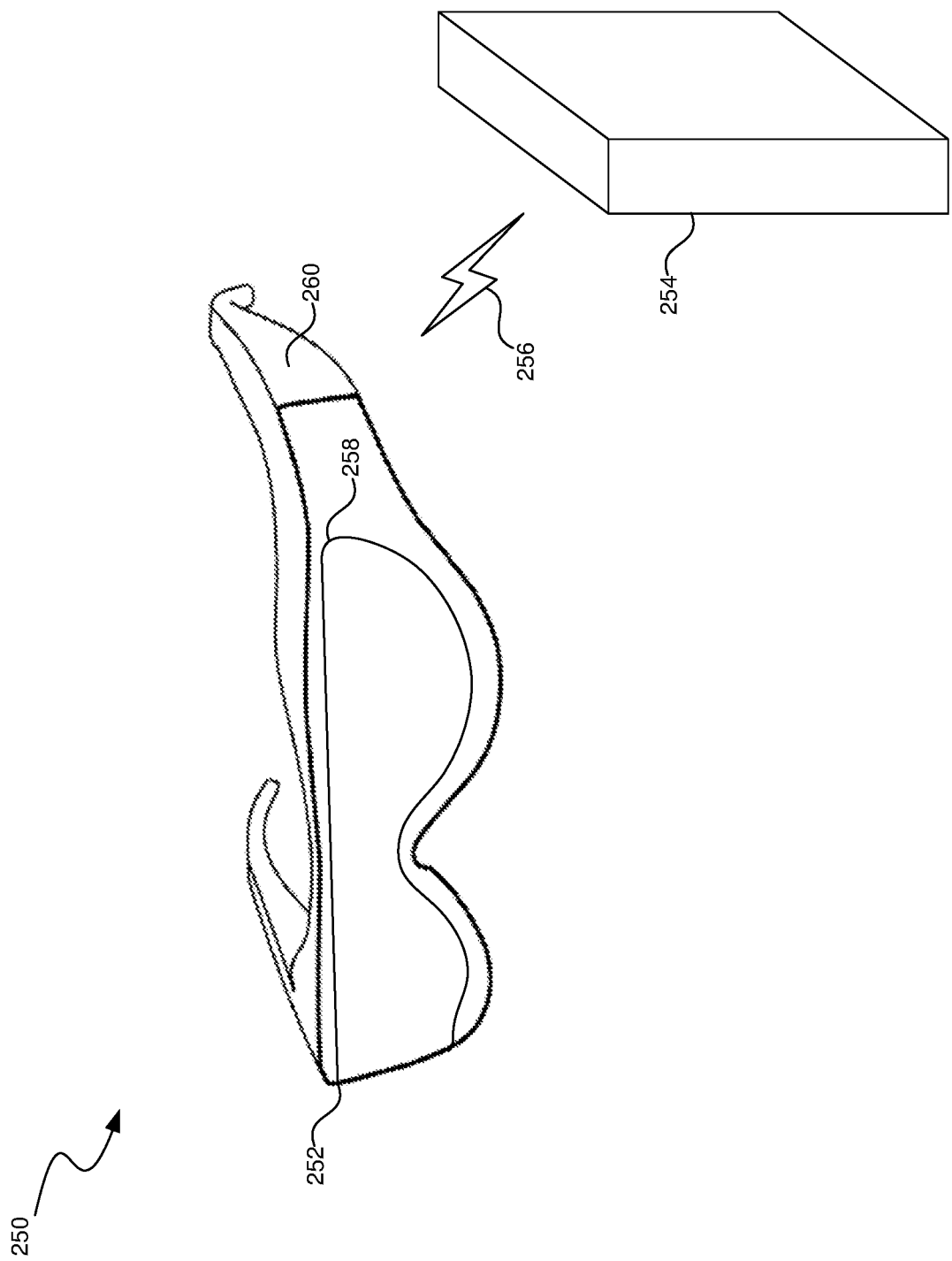
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
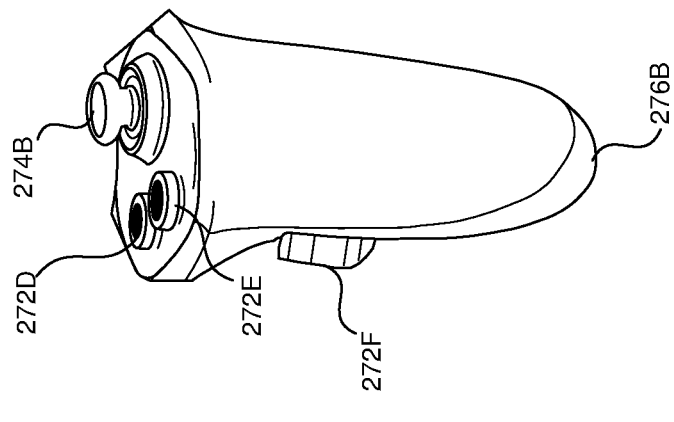
FIG. 2C is a wire diagram illustrating controllers which, in some implementations, a user can hold in one or both hands to interact with an artificial reality environment.
Figure 2C:
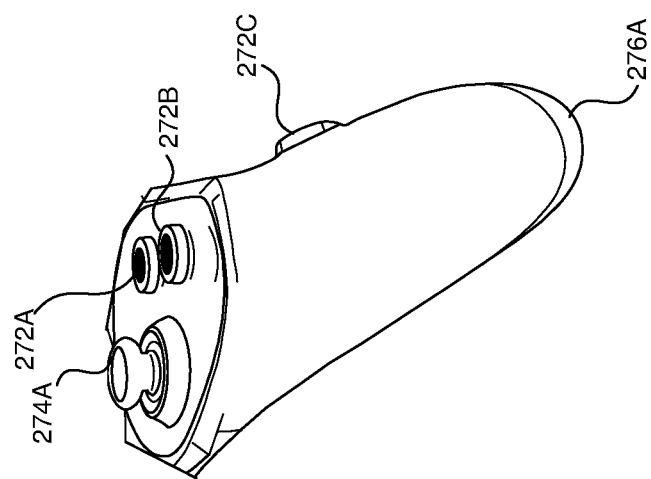
Figure 2C:
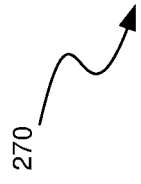

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
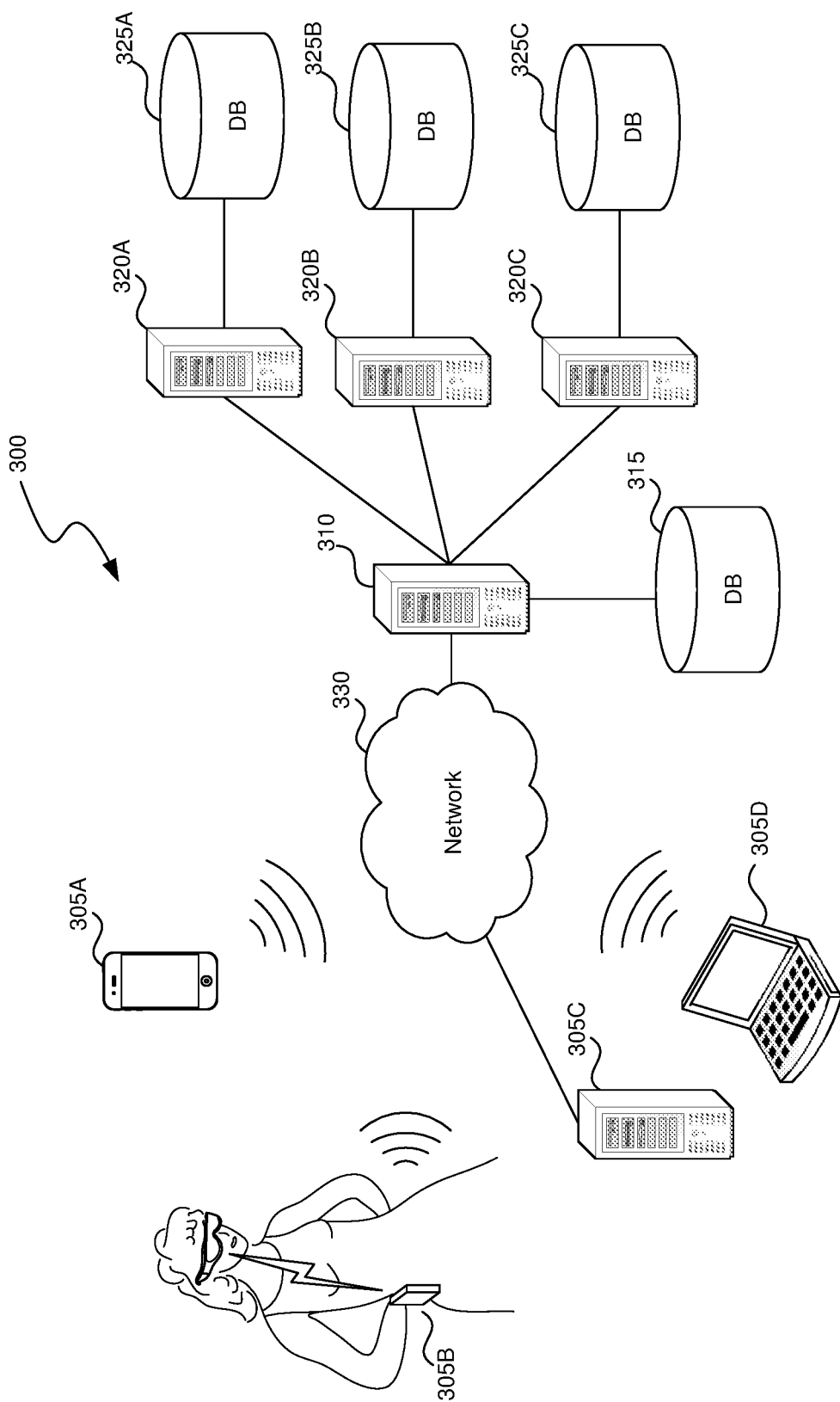
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have its own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
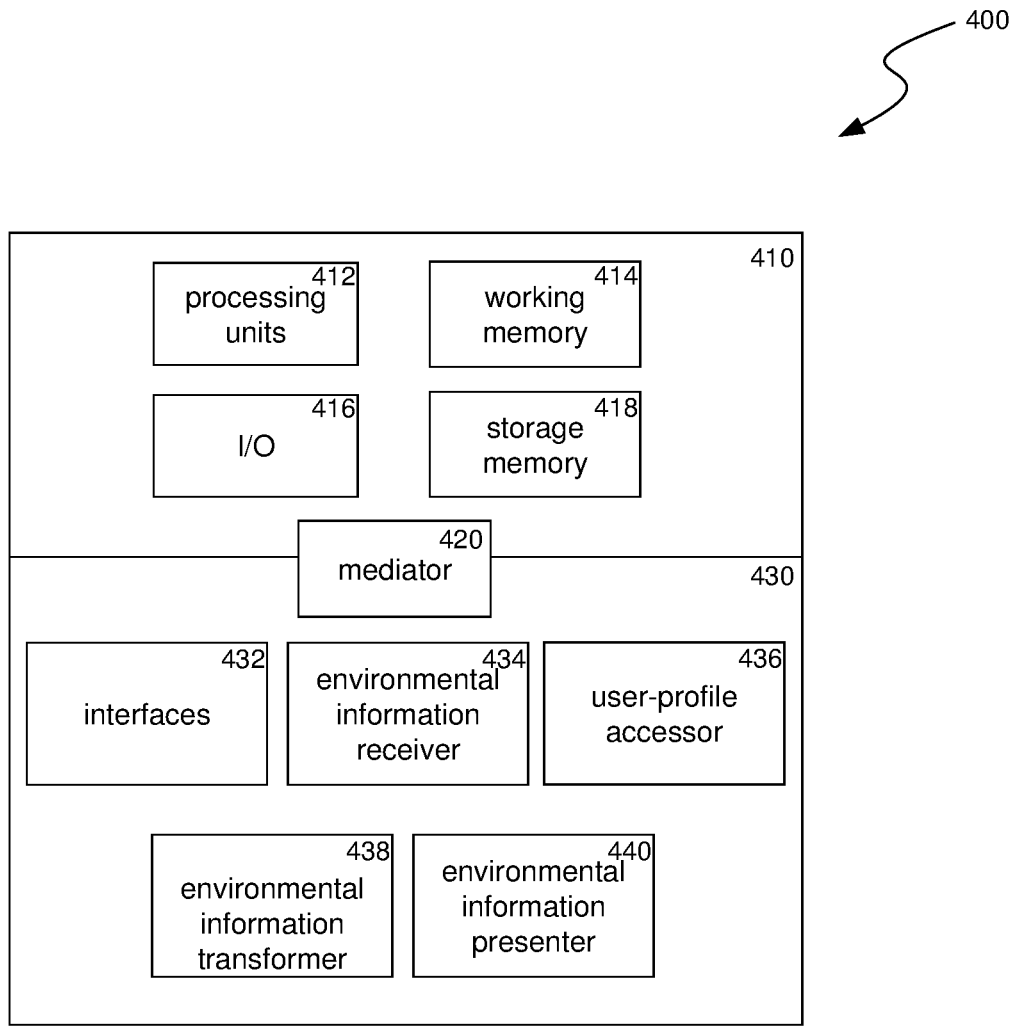
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for receiving, transforming, and presenting environmental information. Specialized components 430 can include an environmental information receiver 434, a user-profile accessor 436, an environmental information transformer 438, an environmental information presenter 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

As the user's environment may include real-world objects interspersed with aspects of artificial or enhanced reality, the environmental information receiver 434 can receive information from real-world sensors (e.g., a camera, microphone, depth sensors, etc.) and from an XR feed. In various implementations, from the received information, the location and properties of the user and of various objects are mapped into a virtual space. The received information can also include properties of information presenters (e.g., visual screens, speakers, haptic devices) available to the user. Additional details on the workings of the environmental information receiver 434 are provided below in relation to block 504 of FIG. 5.

The user-profile accessor 436 retrieves user-personalized information. For example, the profile may indicate the user's preferred sensory-modality, such as that the user prefers visual data due to being deaf in one ear or requires visual transformations due to being color blind. The profile may also include the user's preferences for displaying information in his environment. Additional details of the user-profile accessor 436 are provided below in relation to FIG. 6 and block 502 of FIG. 5.

The environmental information transformer 438 takes the information received by the environmental information receiver 434 and transforms at least some of it in light of the information provided by the user's profile and in light of the virtual-world mapping. The transformation may include changing the range of values presented by one sensory modality and may also include changing received information from one sensory modality to another, all depending upon the user's profile and on the information presenters available in the user's environment. Additional details on the workings of the environmental information transformer 438 are provided below in relation to block 506 of FIG. 5.

The environmental information presenter 440 takes the information as transformed by the environmental information transformer 438 and presents it to the user. This transformed information can be presented in combination with received environmental information that the environmental information transformer 438 did not alter (that is, "pass-through" information). The information is presented through the information presenters available in the user's environment, such as screens, speakers, and a haptic glove. Additional details are provided below in relation to blocks 508 and 510 of FIG. 5.

Additional information about the inter-workings of the environmental information receiver 434, the user-profile accessor 436, the environmental information transformer 438, and the environmental information presenter 440 are provided below in relation to FIG. 7.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
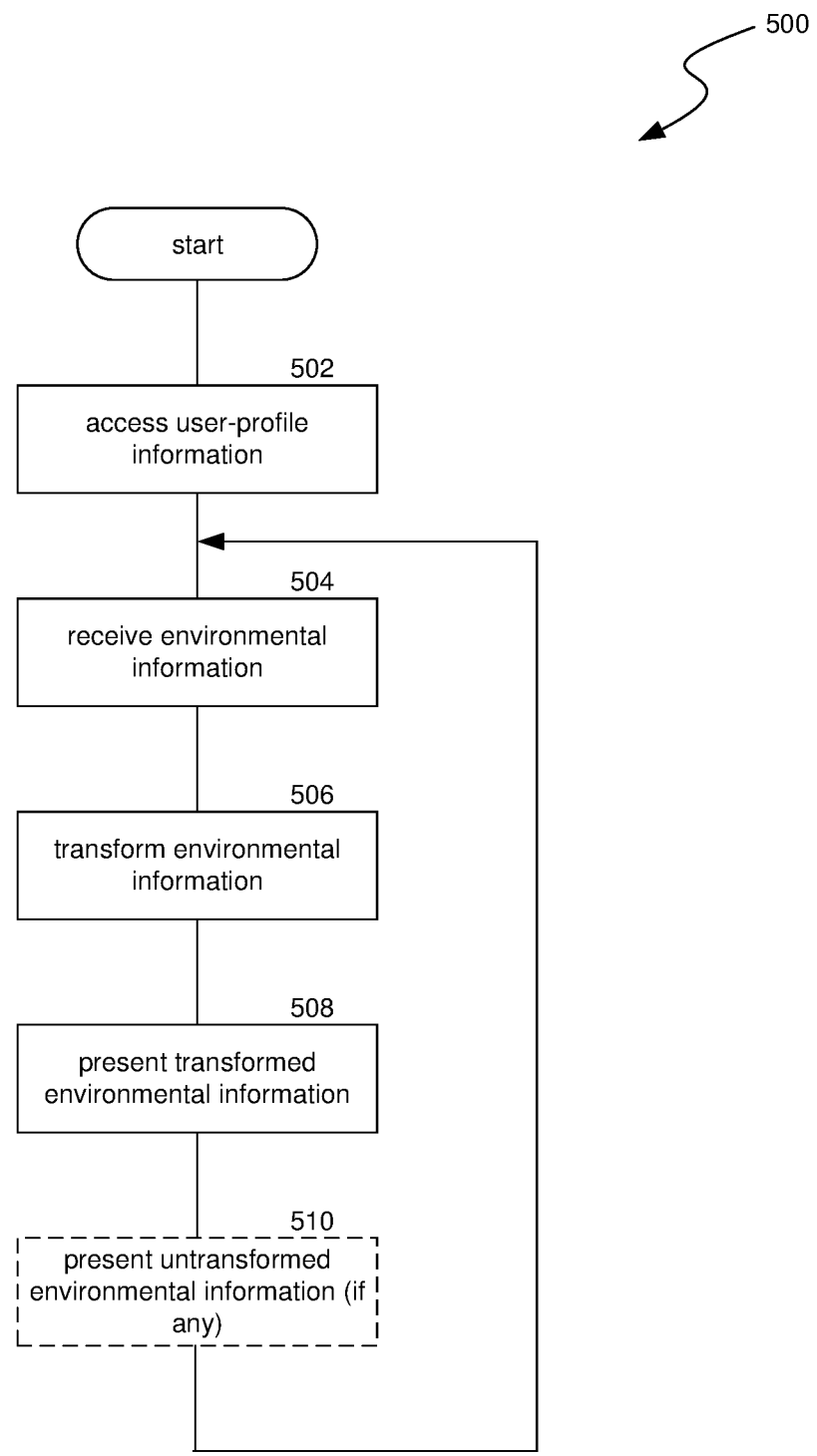
FIG. 5 is a flow diagram illustrating a process used in some implementations of the present technology for presenting transformed environmental information.

FIG. 5 is a flow diagram illustrating a process 500 used in some implementations for presenting transformed environmental information to a user. In some implementations, this process 500 runs as long as the user is in a suitable environment. It may be invoked when, for example, a user turns on an HMD 200, 250 and runs as long as that HMD is active. Because this process 500 accesses user-profile information (see step 502 below), in some embodiments it only runs after a process for populating that user-profile is invoked. (See FIG. 6 and the accompanying text for an exemplary method for populating the user profile.) In some implementations, process 500 can be performed on a user device (e.g., an artificial reality device, haptic device, mobile device, etc.). In other implementations, process 500 can be performed on a server system, which can, in-turn, provide controls to such a client device.

At block 502, the process 500 accesses profile information associated with this user. In some implementations, this profile information includes a description of qualities of the user's sensory modalities. For example, the profile may show that this user is color blind or entirely blind. The user's hearing may be limited in the frequencies which she can hear. Some epileptics are sensitive to high contrast visual or auditory inputs, and the profile can note that sensitivity. Many other examples could be given simply by considering the abilities, and sometimes the impairment of abilities, of the senses we use every day. Other specific examples are presented in the development of scenarios given below (see especially the text accompanying blocks 506 and 508). In other implementations, process 500 can be configured to provide a particular type or types of transformations of environment information for a user, and thus does not provide a separate check of the user profile.

At block 504, information about a user's environment is received. Many types of information are possible here. Visual information (that is, what the user is seeing given the direction and focus of his gaze) and sound are often part of the environmental information, but that information could also include the geographic location of the user, the user's orientation in space including head and eye orientation, the focus of the user's gaze, air temperature, etc. Some implementations focus on specific types of information in this step and mostly ignore other types.

The user's current environment may be purely real, purely virtual, or a combination of the two. Thus, for example, visual information received may be a combination of output from one or more cameras or other sensors and output created by an XR system. For example, an artificial reality device may perform a scan of an environment with raw data captured by traditional cameras, depth cameras, LIDAR devices, SONAR devices, devices that emit and capture the patterns of infrared light, etc. This raw data can be analyzed to, for example, identify surfaces, objects/object types, people, etc., (referred to generally as objects herein) as well as characteristics of such objects (e.g., color, texture, size, orientation, etc.) In some cases, this analysis can be accomplished by applying various machine learning models, such as a model that identifies object labels, a model that produces 3D models or depth data for objects, a model that can identify surfaces (e.g., walls, floors, ceilings, tabletops, etc.), a model that can provide localization information for objects, etc. Using the results of this analysis, process 500 can generate a virtual space in which the user is operating, which can place the scanned objects according to their real-world position, identify the user's location in that virtual space, and map virtual objects created by an artificial reality device into the virtual space. In some implementations, various simulations localization and mapping (SLAM) technologies are employed to perform this environment scanning.

In block 506, the process 500 transforms the environmental information received in block 504. In some cases, the transformations to be performed are selected in light of the user's profile accessed in block 502. Generally speaking, these transformations fall into two categories: (i) translating values from one range to another within one sensory modality and (ii) transforming information from one sensory modality to another. Example transformations can include changing the audio to be in certain frequency ranges, translating location information into haptic output (e.g., through a glove or oral system), translating location and object-specific information into audio output, translating color data into alternate visual output, audio output, or haptic output, and translating important sounds into visual cues. Detailed examples are given immediately below.

A first category of transformation involves changing the values of a sensory modality from one range to another. As a first example, if the user profile indicates that the user hears only in a limited frequency range, then the environmental sounds, or at least the ones deemed important, can be compressed into that range, and any unimportant sounds filtered out to aid the user' auditory experience. The resulting easier-to-comprehend sound is output to the user's speakers in block 508 (below).

As a second example in this first category, if the user's eyes are not sensitive to low-level lighting, then the lighting level in these areas can be increased. Similarly, for a color-blind user, texture can be added to objects to depict color or floating tags can be created and shown tied to visual objects ("this is blue"). The transformed visual information is presented to the user's display screen in block 508.

In a third example in this first category, the process 500 reduces the contrast in received environmental information within each sensory modality (i.e., visual and auditory). This lowers the risk of epileptic incidents. The reduced-contrast visuals are displayed to the user's display screen, and the reduced contrast sounds are played to the user's speakers, in block 508.

In the second category of transformations, the process 500 transforms received environmental information from one sensory modality to another. As a first example, if the user is blind or nearly so, the process 500 determines the location in space of objects and translates those locations into sound space. (See FIG. 8 and the accompanying description for an illustration of this example.) Thus, a table directly in front of the user may be translated into a sound that seems like it is coming from directly ahead of the user and below his viewpoint. The sound may get louder or more strident as the user approaches the table. Because the spatial resolution in sound space is less than that in visual space, the process 500 may usefully categorize objects by their importance (e.g., distance from the user and relative size), perform the above transformation on objects whose importance is above a certain level, and ignore objects of lesser importance. To keep the sound-space information understandable, the process 500 may also limit the number of objects it transforms into the sound space.

In an additional instance of the second category of transformations, received visual information can be transformed to vibrations sent to a haptic glove that show object location in space and even texture as the user reaches out to touch the object. When the user reaches out with his gloved hand, haptic signals can allow the user to feel the edges of the object. The created haptic information is sent to the user's glove, and the created audio information, potentially combined with untransformed received audio information, is played on the user's speakers in block 508.

Another example second category of transformations goes in the other direction—transforming relevant sounds into visual information. The process 500 enhances the perception of hearing-impaired users by transforming relevant sounds (for example, a siren) into visual information such as blinking lights whose location and movement tell the user where the sound is coming from, how urgent its call, and the like. To do this, the process 500 may analyze incoming sounds to determine their importance. For real sounds, the analysis can involve volume, stridency, and temporal change. For a virtual sound, the analysis can involve all of the above plus reading meta-information placed in association with the virtual sound by the XR system that created it. In place of or in addition to the above, the process 500 may transform some sounds into vibrations, e.g., a low-level vibration delivered to the user via a haptic glove or sock may indicate a sound whose location is not yet determinable. The created haptic information is presented to the user's glove, and the created visual information is displayed on the user's screen, in block 508.

In some circumstances (possibly due to a setting in the user's profile), the process 500 treats received environmental information about real objects differently from information about virtual objects. (Note that here "objects" include anything in the environment including sounds.) While wearing an HMD 250 with a pass-through display 258, a user, even one with less than standard eyesight, might wish the real visual information to be left untransformed while virtual information is transformed for his benefit.

At block 508, the transformed environmental information is presented to the user, such as via the user's HMD 200, 250, personal computer 305D, or smartphone 305A. As described in the examples above, transformed visual information can be combined with "pass-through" visuals and displayed on the user's display screen. Transformed auditory information, combined with pass-through sounds, are displayed on the user's speakers. Both display screens and speakers can be part of an HMD 200. Haptic signals are sent to the user's haptic glove. Recent developments allow some transformed visual information to be delivered to a plate on the user's tongue or skin, giving a low-resolution, but often welcome, visual scene to the visually impaired. Today, auditory signals can be fed to an under-the-skin electronic implant completely bypassing the user's ears. Future implementations of the process 500 can be adapted to use other implants yet to be developed.

Block 510 serves to note that the system can pass some of the received environmental information untransformed to the user, mixed in with the information transformed in block 506 to create a unified scene more readily perceived by the user. The arrow after block 510 indicates that this process 500 can be an ongoing one, generally operating in real time, possibly many times per second as the resolution of the received information demands.

Figure 6:
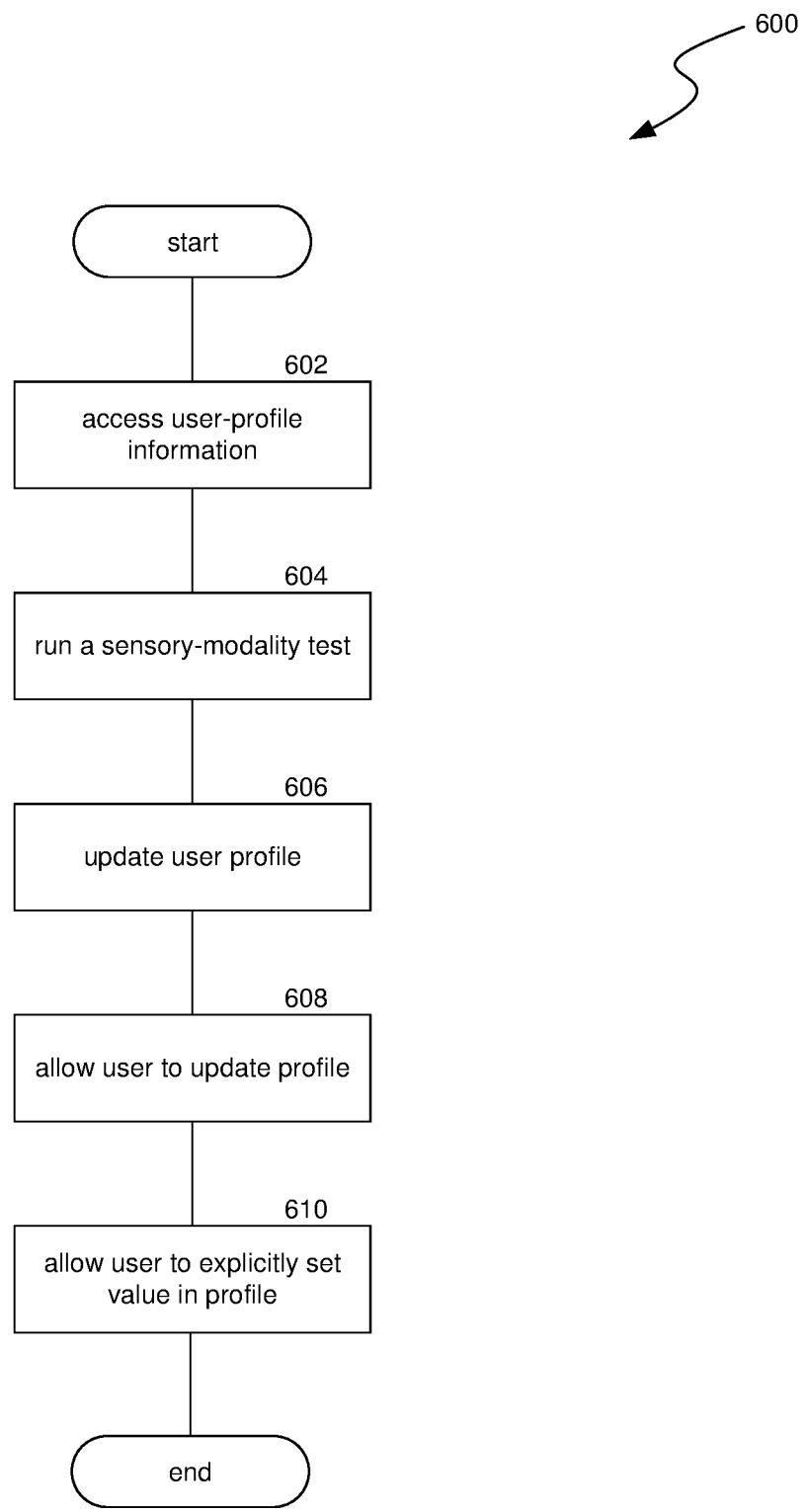
FIG. 6 is a flow diagram illustrating a process used in some implementations of the present technology for populating a user profile.

FIG. 6 is a flow diagram illustrating a process 600 used in some implementations for populating the user profile accessed by process 500 in block 502. Process 600 can be run before process 500 is first run for a particular user. It can also be re-run to fine-tune the user's profile after running process 500 at least once. Because process 500 may need at least a minimally populated profile to proceed, it may need to call this process as soon as a user turns on an HMD 200, 250.

In block 602, process 600 accesses the user's profile (if it exists) and optionally displays its information to the user. The process 600 could also direct the user to gaps in the existing profile rather than presenting all of its information.

In block 604, a sensory-modality test is run. For example, blocks of slightly differing colors could be shown to the user who is asked to distinguish between them. Depending upon the results, this test can be repeated until the process 600 can accurately gauge the user's color sensitivity. The process 600 can run many different types of tests here including rather complicated scenarios (i.e., games) in which the user is directed through an XR scenario, and the process 600 notes her responses and gauges the qualities of her sensory modalities.

Once a determination of some aspect of the user's sensory modality is achieved, that result is reflected in a value, or a set of values in some cases, written to the user's profile in block 606. Everyone's tastes and abilities differ, so block 608 allows the user to tweak the profile information generated by process 600.

In some implementations, instead of or in addition to the sensory-modality tests, process 600 can present options to a user through a visual, auditory, or other interface, allowing the user to explicitly set a value into her profile in block 610, which may bypass the testing and profile updating of blocks 604 and 606. This is important for preferences that may not be discernable by a testing process such as whether the user prefers that visual information about real objects remain untransformed. It is even more important where such tests are contraindicated. For example, testing an epileptic to determine his sensitivity level to high contrast visual and auditory inputs can be extremely dangerous and should only be done under expert supervision and with medical remediation immediately available.

The process 600 need not be independent of process 500. That is, as the user responds to the transformed and non-transformed environmental information presented to him in blocks 508 and 510, the system can note areas in which the user seems to be having some difficulty. That is, the entire process 500 can be seen as an example of the tests of block 604. In this manner, the user's profile, and thus his experience, is constantly refined to align with the particular qualities of his sensory modalities.

Figure 7:
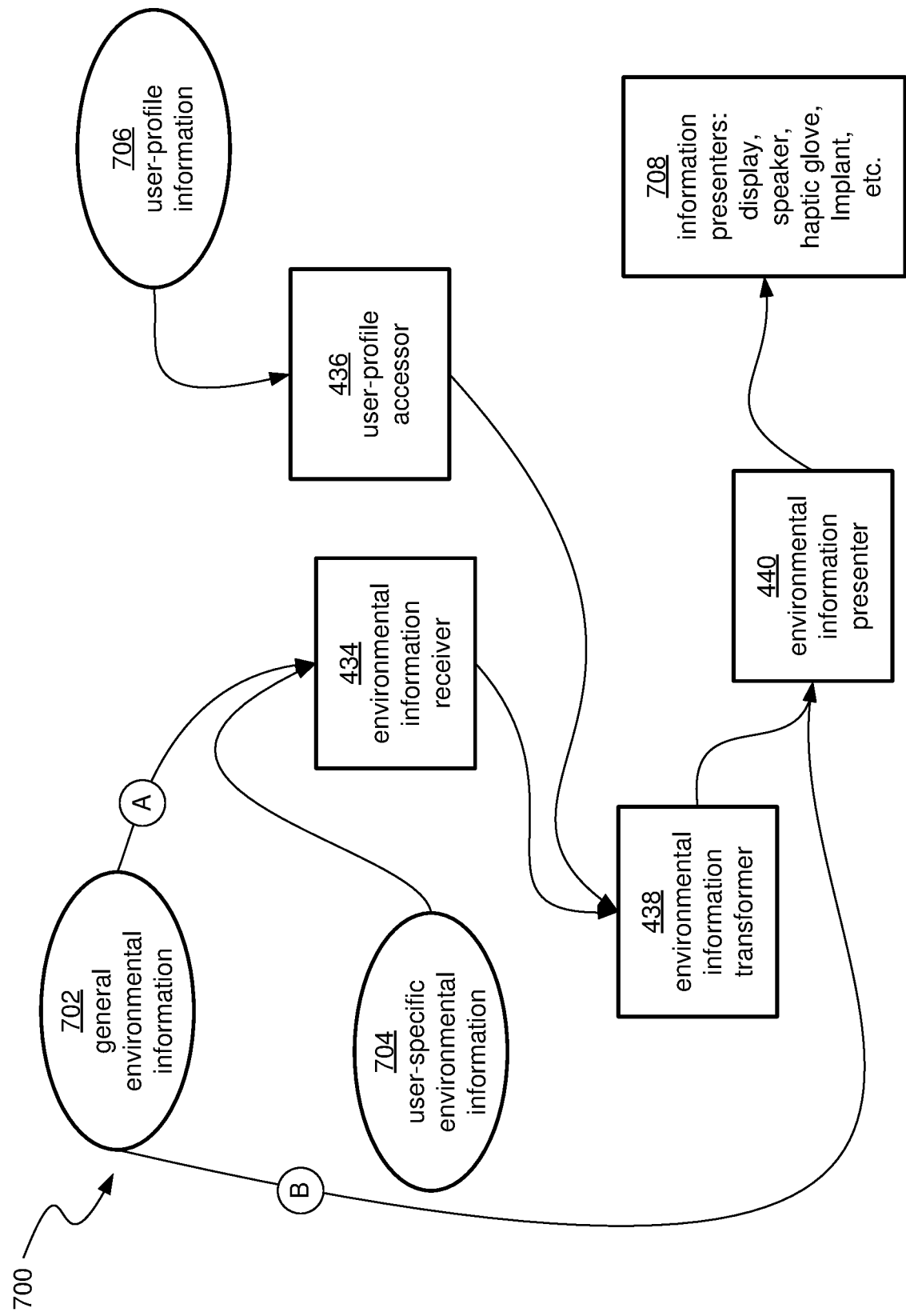
FIG. 7 is an information-transformation diagram illustrating relations among information and processing components in some implementations of the present technology.

FIG. 7 is an overview of the components of the environment-transforming system working together. FIG. 7 includes the relations among information flows and processing components. The work in view 700 conceptually begins when the user's general environmental information 702 is created. This can include processing output from real-world sensors and receiving information created by an XR system. A SLAM system, for example, combines that information into a virtual model map. The virtual map includes identifications of locations of real-world and virtual objects.

Information 704 is more specific to a particular user than information 702, though it can also be produced by the SLAM system. The user-specific information 704 includes, for example, a tracking of the position of the user in the virtual map, the user's orientation (including body, head, and eye orientations), the focus of the user's gaze, etc.

The upper arrow "A" leaving the environmental information 702 shows the environmental information receiver 434 accessing that information. The environmental information receiver 434 also accesses the user-specific information 704. This information access is described above in relation to block 504 of FIG. 5.

Meanwhile, the user-profile accessor 436 retrieves information from the user's profile information 706. That information 706 can include sensory-modality limitations and user-supplied presentation preferences. The user-profile accessor 436 is described above in relation to block 502 of FIG. 5 and the entirety of FIG. 6.

The environmental information transformer 438 receives environmental information from the environment-information receiver 434 and from the user-profile accessor 436. It then transforms at least some of the received environmental information in light of the user's profile information. The operation of the environmental information transformer 438 is described in relation to block 506 of FIG. 5.

The environmental information presenter 440 receives the transformed environmental information from the environmental information transformer 438. Following the lower arrow "B" coming from the general environmental information 702, the presenter 440 may also receive some unaltered environmental information. The presenter 440 combines the transformed and the unaltered information, if any, and sends the combination to the appropriate information presenters 708.

Different user environments may include different sets of user presentation devices 708. A blind user may not have a display screen; any user may have a haptic glove. Some users may have an oral device for displaying visual or haptic information via the tongue. Knowledge of this user's set of user presentation devices 708 is part of the user-specific information 704. The environmental information transformer 438 and the environmental information presenter 440 use their knowledge of which presenters are available in directing their output to the appropriate information presenters 708.

Figure 8A:
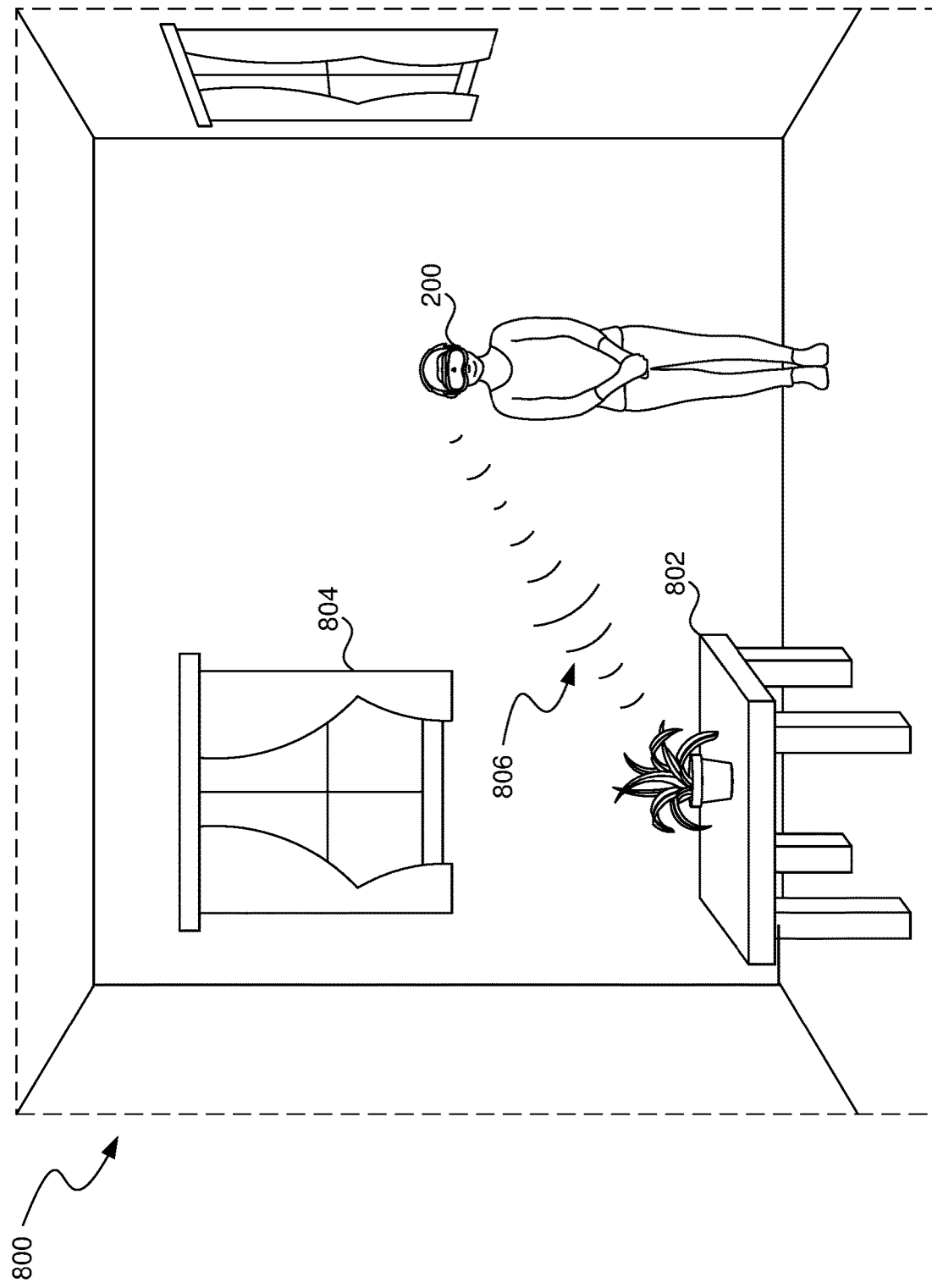
FIG. 8A is a conceptual diagram of a table's location being presented to a user via sound.

FIG. 8A depicts one of the transformation scenarios described above in relation to block 506 of FIG. 5. From the user profile, the process 500 of FIG. 5 knows that the user in FIG. 8A is blind or nearly so. Consulting the virtual reality map it receives as part of the general environmental information 702 (see FIG. 7), the process 500 determines the location in space of objects and translates those locations into sound space. Because the spatial resolution in sound space is less than that in visual space, the process 500 may usefully categorize objects by their importance (e.g., distance from the user and relative size), perform the above transformation on objects whose importance is above a certain level, and ignore objects of lesser importance. In the scenario 800 of FIG. 8A, the user's proximity to the table 802 renders the table 802 important, while the window 804 is probably of little importance, and thus its location is not transformed into sound. The location of the table 802 is then transformed into a sound 806 that seems like it is coming from directly ahead of the user and below her viewpoint. The sound 806 may get louder or more strident as she approaches the table 802. The audio information 806 created about the table 802, potentially combined with untransformed received audio information 702, is played on the speakers in the user's HMD 200.

Figure 8B:
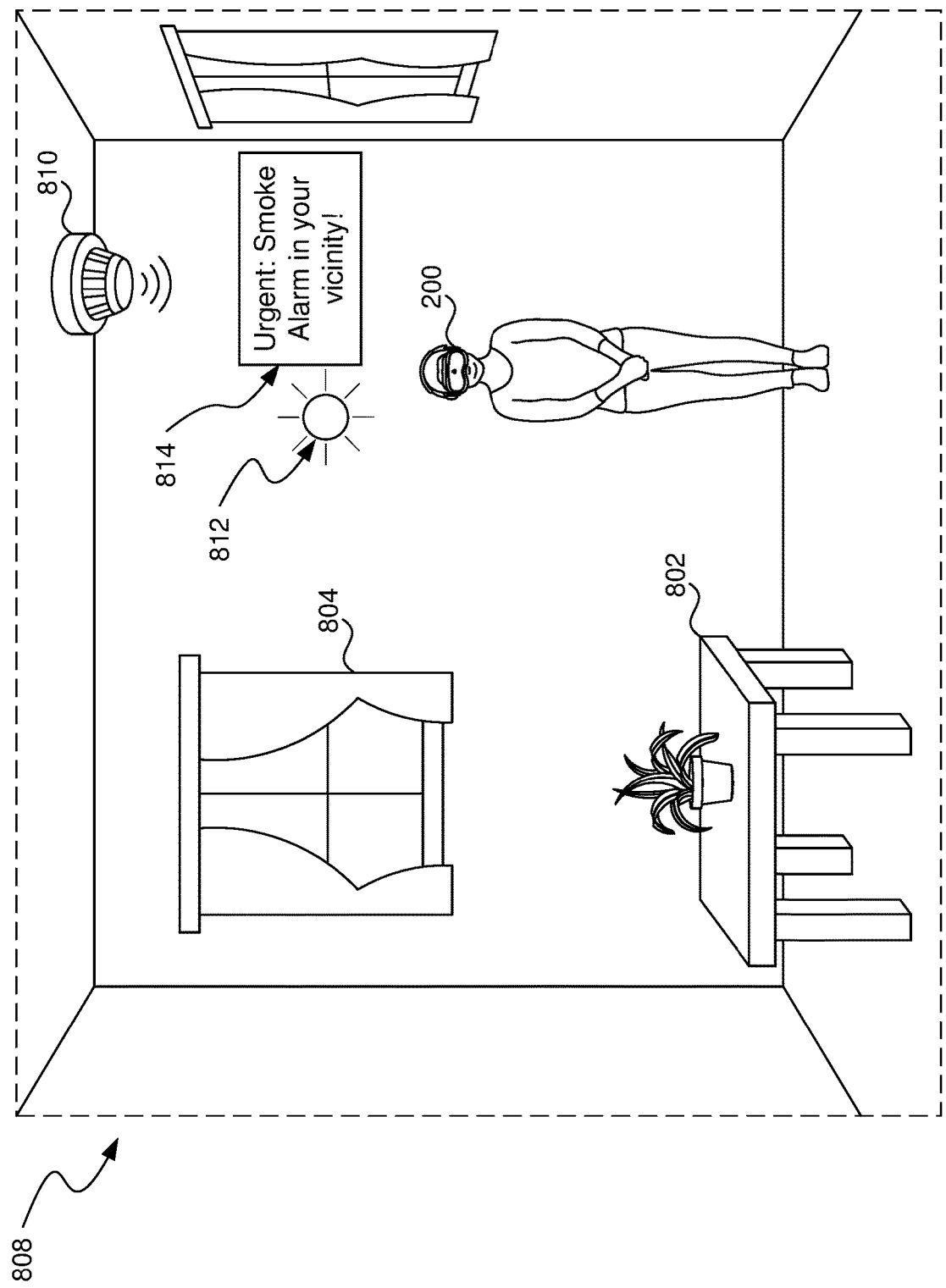
FIG. 8B is a conceptual diagram of a smoke alarm's auditory alert being visually presented to a user.

FIG. 8B portrays another example discussed above in relation to block 506 of FIG. 5. Because the process 500 knows that the user in FIG. 8B is hearing impaired, the process 500 transforms relevant environmental sounds into visual information whose location and movement tell the user where the sound is coming from, how urgent its call, and the like. To do this, the process 500 may analyze incoming sound information (702 in FIG. 7) to determine their importance. For real sounds, the analysis can involve volume, stridency, and temporal change. For a virtual sound, the analysis can involve all of the above plus reading meta-information placed in association with the virtual sound by the XR system that created it. In the scenario 808 of FIG. 8B, the smoke alarm 810 is sounding, and the process 500 analysis identifies this type of sound and its importance. The sound information is translated to both a visual blinking light 812 to grab the user's attention and a floating text box 814 that gives more detail about this important sound. Both visuals 812, 814 are displayed on the display screens in the user's HMD 200. In a variant (not illustrated), the process 500 may transform a sound into vibrations delivered to a user's haptic glove, the nature of the haptics indicating at least the importance, and potentially the source of, the sound.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for presenting transformed environmental information to a user having an impairment in perceiving information that is received by the user in a specific sensory modality, the method comprising:
    automatically accessing stored profile information associated with the user, the profile information comprising a sensory-input setting identifying that the user has the impairment in perceiving information that is received by the user in the specific sensory modality;
    receiving, from an artificial reality ("XR") feed, information associated with the user's environment, the received environmental information including specific environmental information of a specific virtual object, the specific environmental information being received from the XR feed in the specific sensory modality;
    generating, based on the received information, a virtual model of the user's environment, the virtual model comprising identifications of locations of multiple real-world objects and identifications of locations of multiple virtual objects, including the specific virtual object, wherein a location of the user is tracked in relation to the virtual model;
    transforming, based at least in part on the sensory-input setting, the virtual model and the tracked location of the user, at least some of the received specific environmental information of the specific virtual object to be more readily perceivable by the user, the transforming being performed by A) determining that the location of the user has changed relative to the specific virtual object in the virtual model and B) one or more of:
        generating spatial auditory data with characteristics based on one or more of: the distance between the user and the specific virtual object, the direction of the specific virtual object relative to the user, the size of the specific virtual object, the color of the specific virtual object, or any combination thereof;
        generating haptic data, configured for output to a wearable glove, based on a location of the wearable glove touching a location of the specific virtual object;
        generating haptic data, configured for output to an oral device, that signifies a location of the specific virtual object relative to the user;

generating visual data with characteristics based on one or more of: the distance between the user and the specific virtual object, the direction of the specific virtual object relative to the user, the size of the specific virtual object, the color of the specific virtual object, or any combination thereof; or any combination thereof; and presenting the transformed environmental information to the user.

2. The method of claim 1 wherein the sensory-input setting is associated with one or more elements including: visual acuity, color acuity, low-light-level acuity, width of visual perception, auditory-frequency range, auditory-volume sensitivity, auditory-directional sensitivity, a visual-contrast limit, an auditory-contrast limit, or any combination thereof.

3. The method of claim 1 wherein the location of the user comprises either or both of the user's orientation in the virtual model and/or a focus of the user's gaze in the virtual model.

4. The method of claim 1,
wherein the transforming comprises the generating spatial auditory data; and
wherein the generating spatial auditory data comprises translating received visual data.

5. The method of claim 1,
wherein the transforming comprises the generating haptic data; and
wherein the generating haptic data, configured for output to a wearable glove, comprises translating received visual location data.

6. The method of claim 1,
wherein the transforming comprises the generating haptic data; and
wherein the generating haptic data, configured for output to an oral device, comprises translating received visual location data.

7. The method of claim 1,
wherein the transforming comprises the generating visual data; and
wherein the generating visual data comprises translating received auditory data.

8. The method of claim 1 wherein the transforming comprises applying a first output style to environmental information associated with real objects and applying a second output style, different from the first output style, to environmental information associated with virtual objects.

9. The method of claim 1 wherein the transforming is further based on a command received from the user, the command specifying, at least in part, information to include in the transformed environmental information.

10. The method of claim 1 wherein the transforming comprises translating, at least in part, values of one sensory modality associated with an object in the user's environment from a received range to another range.

11. The method of claim 10 wherein the transforming comprises compressing received sound to a reduced spectrum of frequencies.

12. The method of claim 10 wherein the transforming comprises brightening areas of low lighting in received visual information.

13. The method of claim 1 further comprising:
testing a sensory modality of the user; and
modifying the user profile information based, at least in part, on results of the testing.

14. A computer-readable storage medium storing instructions that, when executed by a computing system, cause the computing system to perform a process for presenting transformed environmental information to a user having an impairment in perceiving information that is received by the user in a specific sensory modality, the process comprising:

automatically accessing stored profile information associated with the user, the profile information comprising a sensory-input setting identifying that the user has the impairment in perceiving information that is received by the user in the specific sensory modality;

receiving, from an artificial reality ("XR") feed, information associated with the user's environment, the received environmental information including specific environmental information of a specific virtual object, the specific environmental information being received from the XR feed in the specific sensory modality;

generating, based on the received information, a virtual model of the user's environment, the virtual model comprising identifications of locations of multiple real-world objects and identifications of locations of multiple virtual objects, including the specific virtual object, wherein a location of the user is tracked in relation to the virtual model;

transforming, based at least in part on the virtual model and the tracked location of the user, at least the specific environmental information of the specific virtual object to be more readily perceivable by the user, the transforming being performed by A) determining that the location of the user has changed relative to the specific virtual object in the virtual model and B) one or more of:

generating spatial auditory data with characteristics based on one or more of: the distance between the user and the specific virtual object, the direction of the specific virtual object relative to the user, the size of the specific virtual object, the color of the specific virtual object, or any combination thereof;

generating haptic data, configured for output to a wearable glove, based on a location of the wearable glove touching a location of the specific virtual object;

generating haptic data, configured for output to an oral device, that signifies a location of the specific virtual object relative to the user;

generating visual data with characteristics based on one or more of: the distance between the user and the specific virtual object, the direction of the specific virtual object relative to the user, the size of the specific virtual object, the color of the specific virtual object, or any combination thereof; or any combination thereof; and presenting the transformed environmental information to the user.

15. The computer-readable storage medium of claim 14 wherein the process further comprises:
testing a sensory modality of the user; and
modifying the user profile information based, at least in part, on results of the testing.

16. A computing system for presenting transformed environmental information to a user having an impairment in perceiving information that is received by the user in a specific sensory modality, the computing system comprising:

one or more processors; and
one or more memories storing instructions that, when executed by the one or more processors, cause the computing system to perform a process comprising:
automatically accessing stored profile information associated with the user, the profile information comprising a sensory-input setting identifying that the user has the impairment in perceiving information that is received by the user in the specific sensory modality;

receiving, from an artificial reality ("XR) feed, information associated with the user's environment, the received environmental information including specific environmental information of a specific virtual object, the specific environmental information being received from the XR feed in the specific sensory modality;

generating, based on the received information, a virtual model of the user's environment, the virtual model comprising identifications of locations of multiple real-world objects and identifications of locations of multiple virtual objects, including the specific virtual object, wherein a location of the user is tracked in relation to the virtual model;

transforming, based at least in part on the virtual model and the tracked location of the user, at least the received environmental information of the specific virtual object to be more readily perceivable by the user, the transforming being performed by A) determining that the location of the user has changed relative to the specific virtual object in the virtual model and B) one or more of:

generating spatial auditory data with characteristics based on one or more of: the distance between the user and the specific virtual object, the direction of the specific virtual object relative to the user, the size of the specific virtual object, the color of the specific virtual object, or any combination thereof;

generating haptic data, configured for output to a wearable glove, based on a location of the wearable glove touching a location of the specific virtual object;

generating haptic data, configured for output to an oral device, that signifies a location of the specific virtual object relative to the user;

generating visual data with characteristics based on one or more of: the distance between the user and the specific virtual object, the direction of the specific virtual object relative to the user, the size of the specific virtual object, the color of the specific virtual object, or any combination thereof; or any combination thereof; and presenting the transformed environmental information to the user.

17. The computing system of claim 16, wherein the computing system is one of: a personal computing device, a smart phone, a server, or an XR headset.

18. The computing system of claim 16 further comprising an information-receiving device which includes one or more of: a camera, a microphone, a GPS receiver, a proprioceptor, an inertial motion unit, a feed from an XR system, or any combination thereof, wherein the information-receiving device generates the information associated with the user's environment.

19. The computing system of claim 16 further comprising an information-presenting device which includes one or more of: a display screen, a speaker, an XR headset, a haptic glove, a tongue plate, a skin plate, an electronic implant, or any combination thereof, wherein the information-presenting device performs the presenting the transformed environmental information to the user.

20. The computing system of claim 16 wherein the transforming comprises:

translating, at least in part, values of one sensory modality associated with an object in the user's environment from a received range to another range.

\* \* \* \* \*